US011227112B2

(12) United States Patent
Perumalla et al.

(10) Patent No.: US 11,227,112 B2
(45) Date of Patent: Jan. 18, 2022

(54) CONTRIBUTIONS COLLECTION BASED ON PARSED ELECTRONIC COMMUNICATIONS BY A QA SYSTEM WHICH GENERATES A REPLY INDICATING A CONTRIBUTOR, THEIR CONTRIBUTION AND A CONFIDENCE LEVEL

(71) Applicant: International Business Machines Corporation, Armonk, NY (US)

(72) Inventors: Sailaja S. Perumalla, Visakhapatnam (IN); Shanthan Chamala, Malvern, PA (US); Gautam Zalpuri, Nashua, NH (US); Apparao Mogali, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 16/223,411

(22) Filed: Dec. 18, 2018

(65) Prior Publication Data

US 2020/0192980 A1    Jun. 18, 2020

(51) Int. Cl.
*G06Q 50/00*     (2012.01)
*G06F 16/33*     (2019.01)
*G06F 16/24*     (2019.01)
*G06F 40/279*    (2020.01)
*G06F 16/332*    (2019.01)
*G06F 40/205*    (2020.01)

(52) U.S. Cl.
CPC ........ *G06F 40/279* (2020.01); *G06F 16/3329* (2019.01); *G06F 16/3334* (2019.01); *G06F 40/205* (2020.01)

(58) Field of Classification Search
CPC ................. G06Q 50/00; G06F 19/32
USPC ......................................... 706/12
See application file for complete search history.

(56) References Cited

U.S. PATENT DOCUMENTS

| | | |
|---|---|---|
| 2012/0311047 A1 | 12/2012 | Yokoi et al. |
| 2014/0129493 A1* | 5/2014 | Leopold .................. G06F 19/32 706/12 |
| 2015/0242796 A1 | 8/2015 | Hilton et al. |
| 2016/0196511 A1 | 7/2016 | Anisingaraju et al. |
| 2016/0371625 A1 | 12/2016 | Mosley et al. |
| 2017/0270099 A1* | 9/2017 | Gorny .................... G06Q 50/00 |

OTHER PUBLICATIONS

"Rideau Recognition Solutions receives new wave of capital from institutional investors led by Fondaction," Cision, Jun. 2018, 5 pages.

* cited by examiner

*Primary Examiner* — Farzad Kazeminezhad
(74) *Attorney, Agent, or Firm* — VanLeeuwen & VanLeeuwen; Jeffrey S. LaBaw (57) ABSTRACT

An approach is provided that provides a recognition, engagement and evaluation system. The approach analyzes textual communications between users with the analysis revealing a contribution made by one of the users, called a contributor. The approach further identifies at least one decision maker based on an organizational relationship between the identified decision maker and the contributor and transmits the identification (name, etc.) of the contributor and the contribution made by the contributor to the identified decision maker, provided as a reply comprising a confidence level by a Question Answer system.

15 Claims, 7 Drawing Sheets

CONTRIBUTIONS COLLECTION BASED ON PARSED ELECTRONIC COMMUNICATIONS BY A QA SYSTEM WHICH GENERATES A REPLY INDICATING A CONTRIBUTOR, THEIR CONTRIBUTION AND A CONFIDENCE LEVEL

BACKGROUND OF THE INVENTION

Description of Related Art

Timely and effective employee feedback and recognition is one of the primary driving factors in employee's productivity. When an employee's work is timely recognized, their satisfaction and productivity improves. Additionally, providing effective feedback will reinforce the importance of how employees are displaying the core values of the company and improve employee productivity and engagement. Not providing timely and effective feedback may de-motivate employees from doing their best jobs and might also negatively impact productivity. Additionally, without recognition, employees are not certain if their contributions are valuable to the organization. Management often fails to provide timely recognition because of various reasons such as not having enough time, not having adequate information about what employees are doing and on how employees are working together and contributing to teams to accomplish organizational goals.

SUMMARY

An approach is provided that provides a recognition, engagement and evaluation system. The approach analyzes textual communications between users with the analysis revealing a contribution made by one of the users, called a contributor. The approach further identifies at least one decision maker based on an organizational relationship between the identified decision maker and the contributor and transmits the identification (name, etc.) of the contributor and the contribution made by the contributor to the identified decision maker.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-7 describe an approach that provides a smart recognition system. The approach described provides multidimensional views, in-depth analysis, meaningfully structured information provided to a decision maker that is responsible for recognizing contributions made by individuals in an organization.

Several different communication channels exists for employees to coordinate with others in the organization. In many cases, an organization's employees collaborate daily activities via face to face conversations, phone conversations, video conferences, group chat communications, etc. In organizations with a global presence and teams spread across many regions, team members often collaborate with others via online meetings, phone conversations, and online group communication channels. Team members discuss, debug, and solve a multitude of items in these group communications including complex technical issues, challenging client situations, debugging production issues, development and operational activities, and the like. Solutions to some of these complex problems can be derived in these group communication channels.

Supervisors of team members that make significant contributions are oftentimes not directly part of the group communications and, therefore, are not always aware of the contributions from the team members. Consequently, employees using traditional systems are often not recognized timely and effectively for their valuable contributions. Even in the case of where decision makers are present in these group communication channels, providing a simple "Thank you" as feedback may not be a meaningful recognition of an employee's efforts. As used herein, "decision maker," refers to a supervisor, manager, or other person that is in a position to recognize contributions of others, based on the organizational structure and positions therein. The decision maker might be in a direct report situation when a person directly reports to the decision maker or might be a non-direct report, such as an upper management or human resources position.

The approach described herein provides a system that allows decision makers to provide more adequate and timely feedback regarding employee contributions. In addition, decision makers can also identify gaps or weaknesses in employee performance and use the system to further coach and mentor such employees. This situation of decision makers not knowing the team members contributions and not providing the timely and effective recognition can create a negative impact on employees' productivity and engagement as well as impacting an organization's success if not adequately addressed.

The approach described herein addresses some common issues regarding employee recognition. First, with regard to the issue of "not having enough time," the system provides a tool that collects data regarding employee contributions in the background as employees are performing their daily tasks. Information regarding contributions is in abundance in online texts and the system uses these online texts to provide timely and time-efficient data to decision makers, such as employees and managers. Second, with regard to the issue of "not properly gauging employees' contributions," the system provided herein gauges employee contributions in terms of both quality and quantity even while employees and decision makers are often pressed for time. Third, with regard to the issue of "not knowing enough," the approach described herein taps into electronic communication channels that employees already use to discuss, debug, and solve complex, challenging technical and client issues. The system analyzes the amount and importance of employee contributions along with identifying the key players including the employee providing contribution and those customers and employees that recognize or acknowledge these contributions.

The approach described herein provides an effective recognition, engagement, and evaluation system that operates by using the methodology as follows. First, recognition gathering is performed by using Natural Language Processing (NLP) techniques on online communication, such as on slack or any social communication channels (e.g., text messaging, email, blogs, etc.) accessible in the workspace. Second, the system considers reactions and comment posts made by various members in the group discussion. Third, the approach assists decision makers by providing required valuable insights with respect to identified and reported issues and the solutions discussed, the amount of time spent on identifying potential solutions, and the people who contributed with solutions taking into consideration irregular work hours and stretch work hours based on individual employee's time zone and shifts. Fourth, the approach provides a dynamic way of reporting contribution data based on the decision maker that is making the request, such as a direct supervisor, an upper manager or executive, or a human resources operator. Fifth, the approach is an integrated approach that provides continuous feedback to the organization's performance evaluation system so that this feedback can be part of employee's performance evaluation as well as used for timely spotting employee contributions and recognizing them in a timely manner. Sixth, the approach provides an option to tag specific comments so that a decision maker can better consider such tagged content during future one-to-one discussions with the employee when evaluating and discussing the employee's strengths, weakness, and passion.

To better equip decision makers, the tool provided by the approach described herein categorizes the contributions and assists the decision maker in identifying individuals who demonstrated the organization's core values. At the same time, the tool assists the decision makers in identifying gaps in an individual's performance in order to coach and mentor such individuals to develop as better performers for the organization.

What is not always clear in a traditional messaging system is a quantitative evaluation of an individual's contribution. This approach addresses this shortcoming by collecting the contributions from a messaging platform and, once collected, measure, by the decision maker with assistance from the system, the individual's contribution within the context of the communication. This measurement is even better understood when the decision makers uses the system to compare one individual's contributions with contributions made by other contributors.

The approach described herein also provides a mechanism that collects context specific peer feedback. In traditional systems, requests for peer feedback are often ignored or not taken seriously. Reasons for such lack of peer feedback can be because of a lack of context to provide the feedback as well as a fear of offending a peer by providing what can be perceived as negative feedback. Both of these reasons are remedied by the disclosed system by framing a request for feedback within the context of a specific time bound event. Further, a request for anonymous feedback moderated through the decision maker can be provided. This leads to increased transparency in the organization regarding reviews, rewards, and growth.

There are many advantages to utilizing the approach and system described herein. Humans are typically connected emotionally. The system caters to the emotional needs of individuals by providing recognition as one of the major driving forces. Such recognition, provided timely and efficiently, helps motivate employees and improve their emotional well-being with regard to the organization. In modern complex organizations, recognition has become a dire requirement for a positive inflow of energy to the organization. Stark differences are often found between those individuals receiving timely recognition and appreciation and individuals who are not receiving such recognition.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
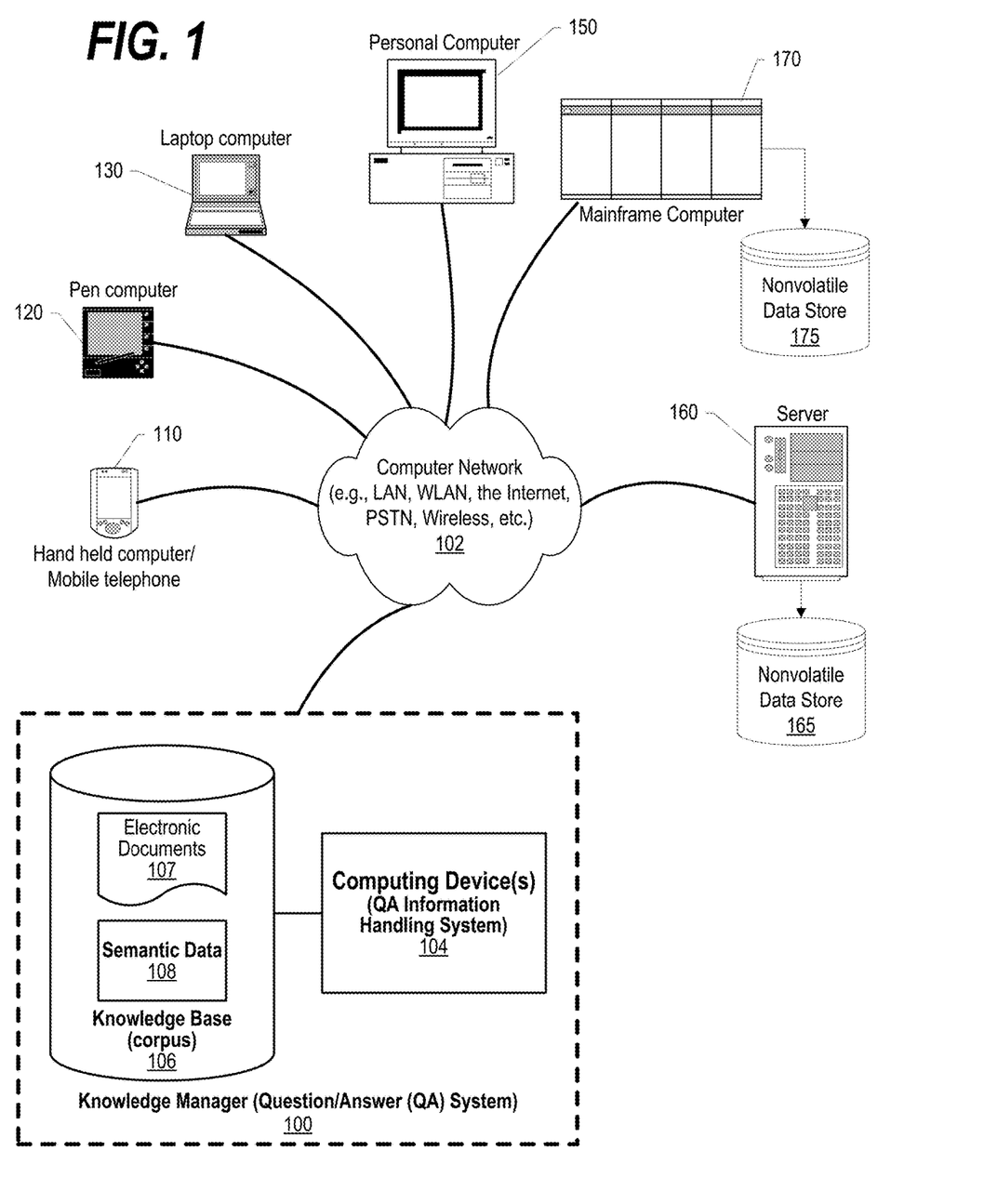
FIG. 1 depicts a network environment that includes a knowledge manager that utilizes a knowledge base.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
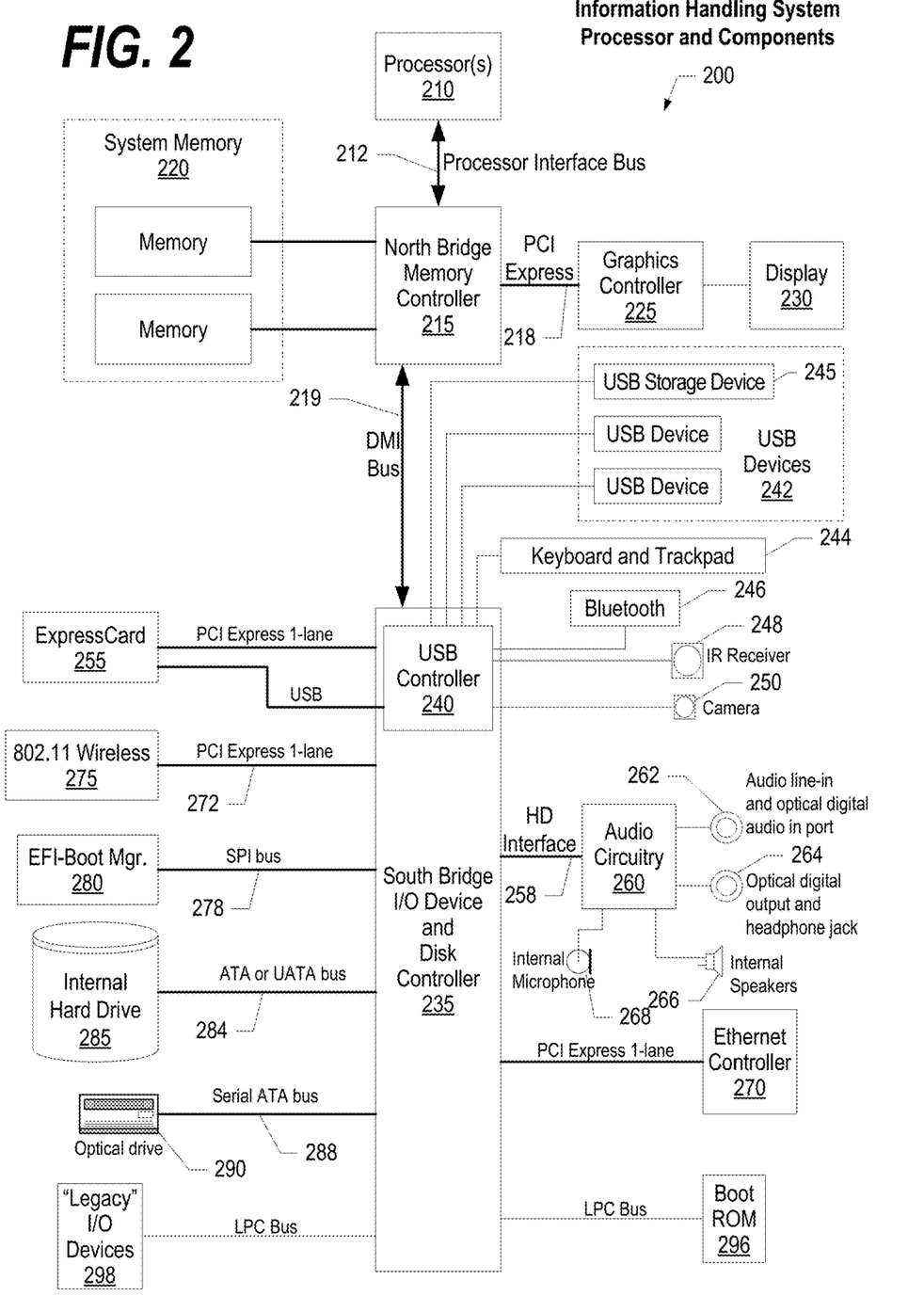
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219.

In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
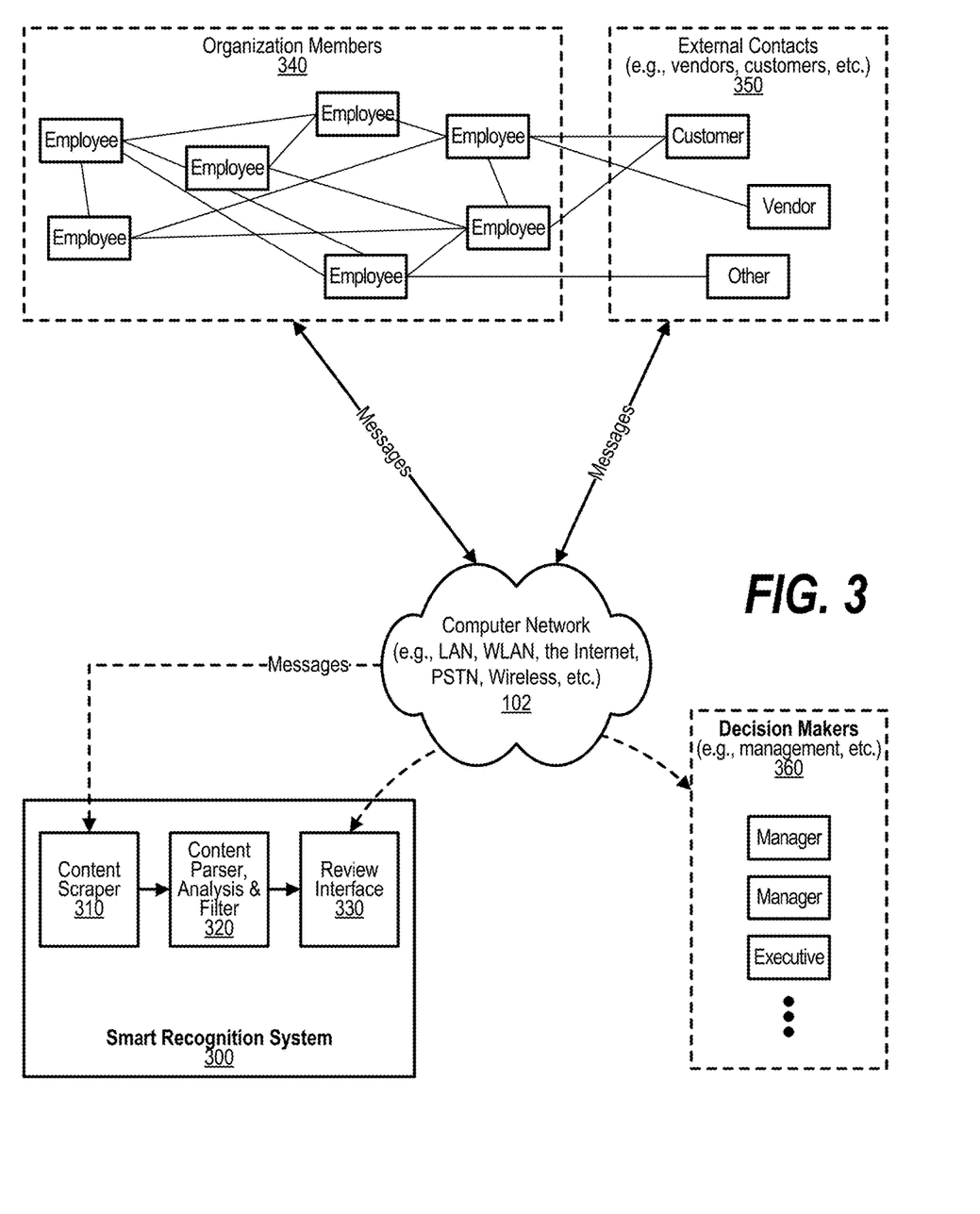
FIG. 3 is a component diagram that shows interaction between entities and components to provide a smart recognition system.

FIG. 3 is a component diagram that shows interaction between entities and components to provide a smart recognition system. Smart recognition system 300 includes processes used to gather contribution data as well as processes used to provide such contribution data to decision makers. These processes include content scraper process 310 that gathers text based communications between various users of text-based communication systems such as emails, text messages, slack channel, blogs, and any other text-based communication systems that the organization employs with such text based communications traveling over computer network 102. Computer network 102 accessed to gather employee contributions is an internal organizational computer network with the system refraining from gathering any communications outside of the organization's internal computer networks. The text-based communications can be between organizational members 340, such as employees and decision makers (e.g., managers, etc.) as well as communication with external contacts 350 such as customers, clients, vendors and the like.

Smart recognition system 300 also includes content parser, analysis, and filter process 320 that parses the text found in text-based communications, analyzes the parsed text to identify those communications that relate to contributions, and filters the potential contribution data to distinguish between contributions that warrant recognition and contributions that do not warrant recognition (e.g., contributions related to solving a customer problem likely warrant recognition while contribution to assist another user with a non-work (personal) issue are likely not recognized as they do not pertain to the organization's business).

Smart recognition system 300 also includes review interface 330 that assists decision makers (e.g., supervisors, managers, executive management, etc.) with reviewing contributions made by various contributors. In one embodiment, this process allows decision makers to view and work with contributions made by those users that report, directly or indirectly, through the decision maker. In this manner, a department manager can view contributions made by members of his or her department. Criteria might be applied so that higher level managers (executives, etc.) are apprised of more significant contributions made by employees in the organization. For example, if an individual employee was instrumental in solving a critical customer problem and numerous text-based communications were created related to the problem and the individual's contribution to solve the problem, then the high level decision maker can be alerted of the contribution so that he or she can properly recognize the individual in addition to any recognition conferred to the individual by the individual's immediate manager.

Figure 4:
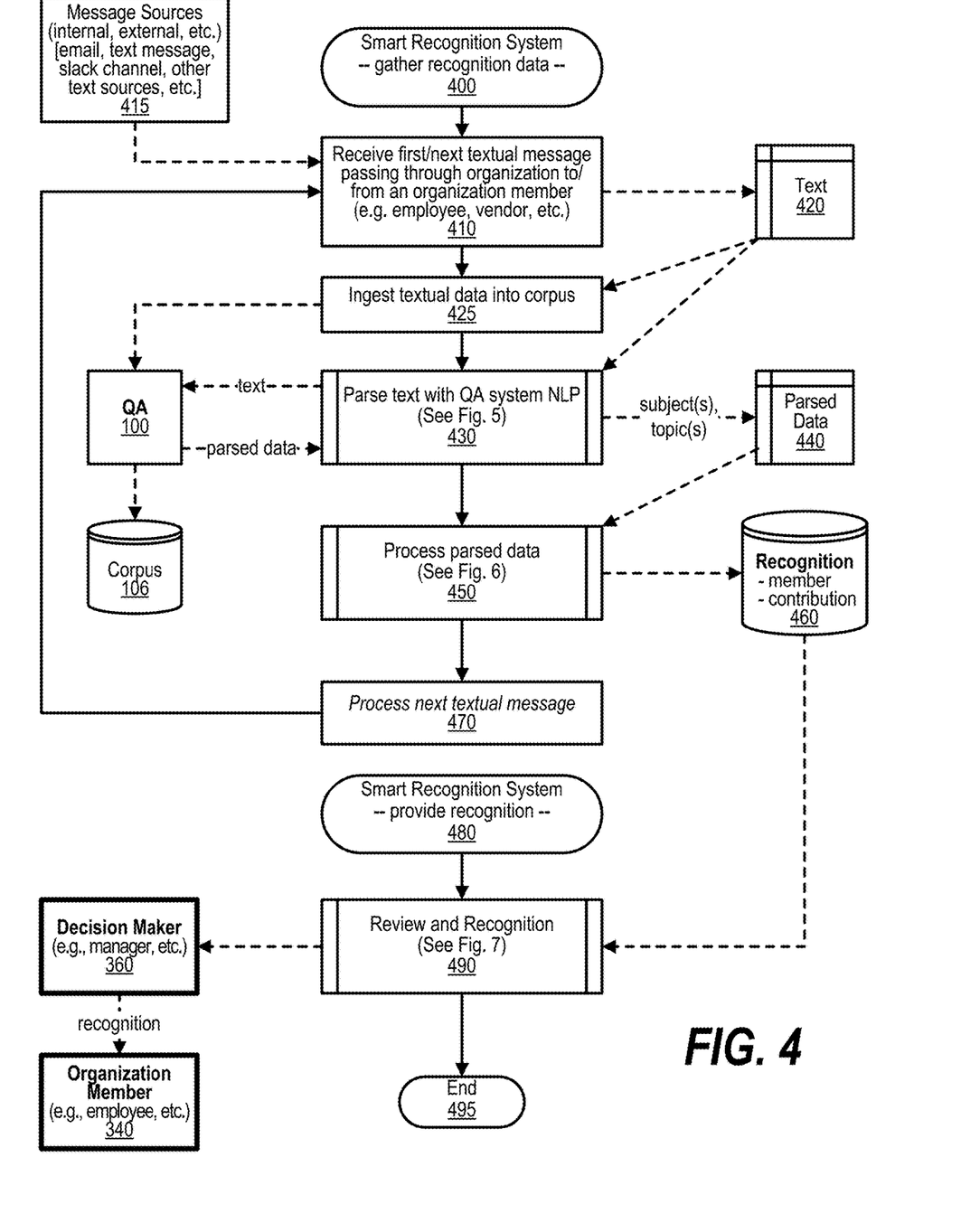
FIG. 4 is a depiction of two high level flowcharts showing the logic used to gather recognition data and provide recognition, respectively.

FIG. 4 is a depiction of two high level flowcharts showing the logic used to gather recognition data and provide recognition, respectively. FIG. 4 processing commences at 400 and shows the steps taken a smart recognition system when gathering recognition data. At step 410, the process receives the first textual message passing through organization to or from an organization member (e.g. between an employee, vendor, manager, etc.). The text is intercepted and stored in memory area 420.

At step 425, the process ingests the textual data stored in memory area 420 into corpus 106 that is utilized by QA system 100. QA system 100 can ingest a variety of information to better identify textual statements that contribute to the organization's success. For example, the QA system can ingest organizational documentation, such as design documents and other internal documents, that have key words, acronyms, and the like that can be compared with terms found in textual communications. For example, an organizational design document focused on an organization's project titled "High Energy Laser Array (HELA)" can be ingested and then textual communications referring to an employee's help with HELA will be understood by the system and being directed to an important organizational project. At predefined process 430, the process performs the Parse Text with QA System Natural Language Processing (NLP) routine (see FIG. 5 and corresponding text for processing details). In one embodiment, predefined process 430 inputs the text captured at step 410 to QA system 100 with the QA returning the subjects (people, etc.) found in the text along with the topics (e.g., technical issue, customer issue etc.) found in the text. The parsed data is stored in memory area 440.

Figure 6:
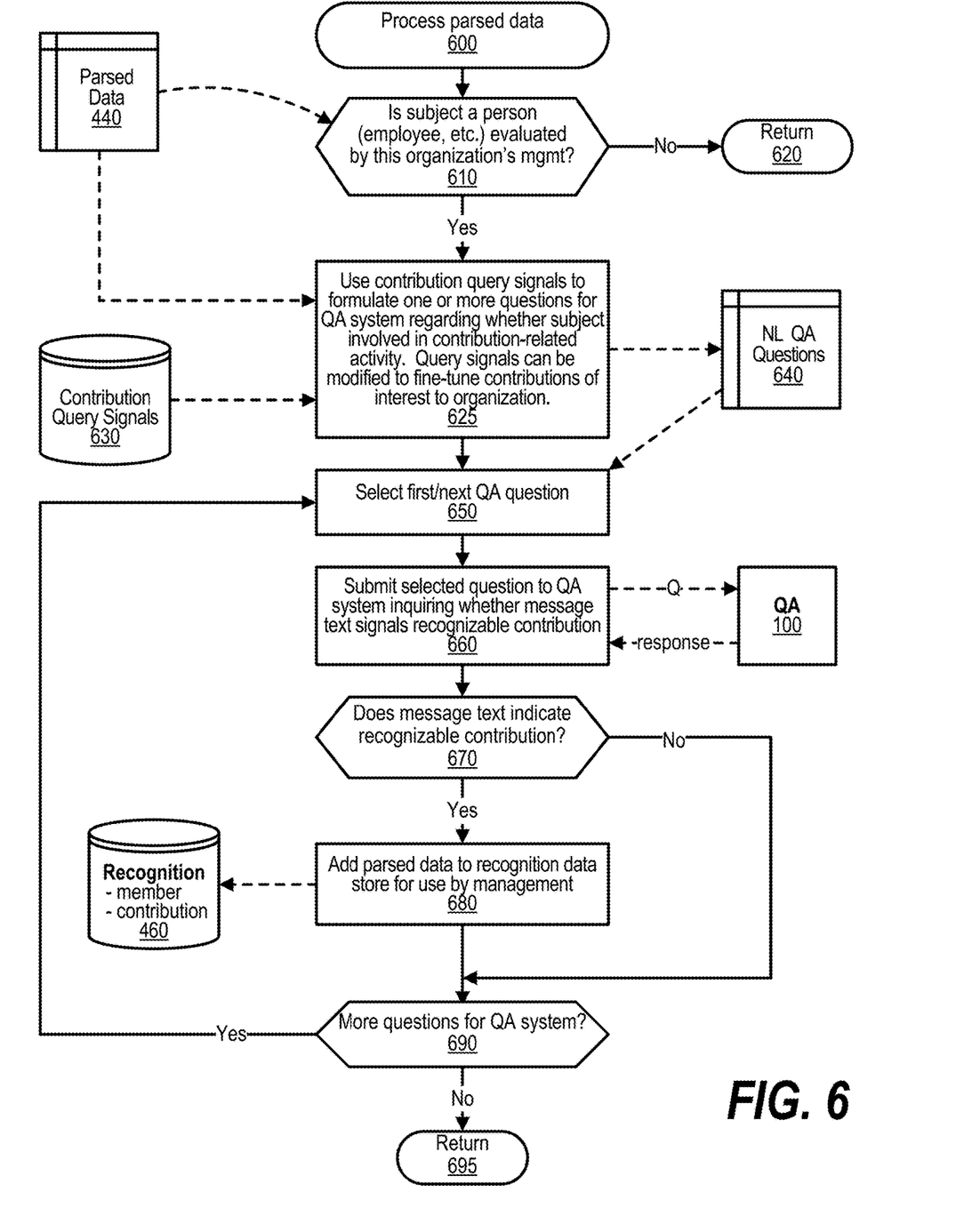
FIG. 6 is a depiction of a flowchart showing the logic used to process the parsed data.

At predefined process 450, the process performs the Process Parsed Data routine (see FIG. 6 and corresponding text for processing details). This routine analyzes the parsed data that was stored in memory area 440 and identifies contributions that possibly warrant recognition. These contributions are stored in data store 460 along with the identification of the contributor(s) and the contributions that were identified in the text data. At step 470, the process processes the next textual message when it is received with the routine repeatedly looping back to step 410 to process the next text data as described above.

At 490 processing commences and shows the steps taken by the smart recognition system when performing a review and recognition process. At predefined process 490, the process performs the Review and Recognition routine (see FIG. 7 and corresponding text for processing details). This routine retrieves recognition data stored in data store 460 and transmits the recognition data to decision makers 360, such as an employee's manager. This allows the decision maker to properly recognize the organization member 340, such as by the manager issuing an employee with an award, bonus, etc. FIG. 4 processing thereafter ends at 495.

Figure 5:
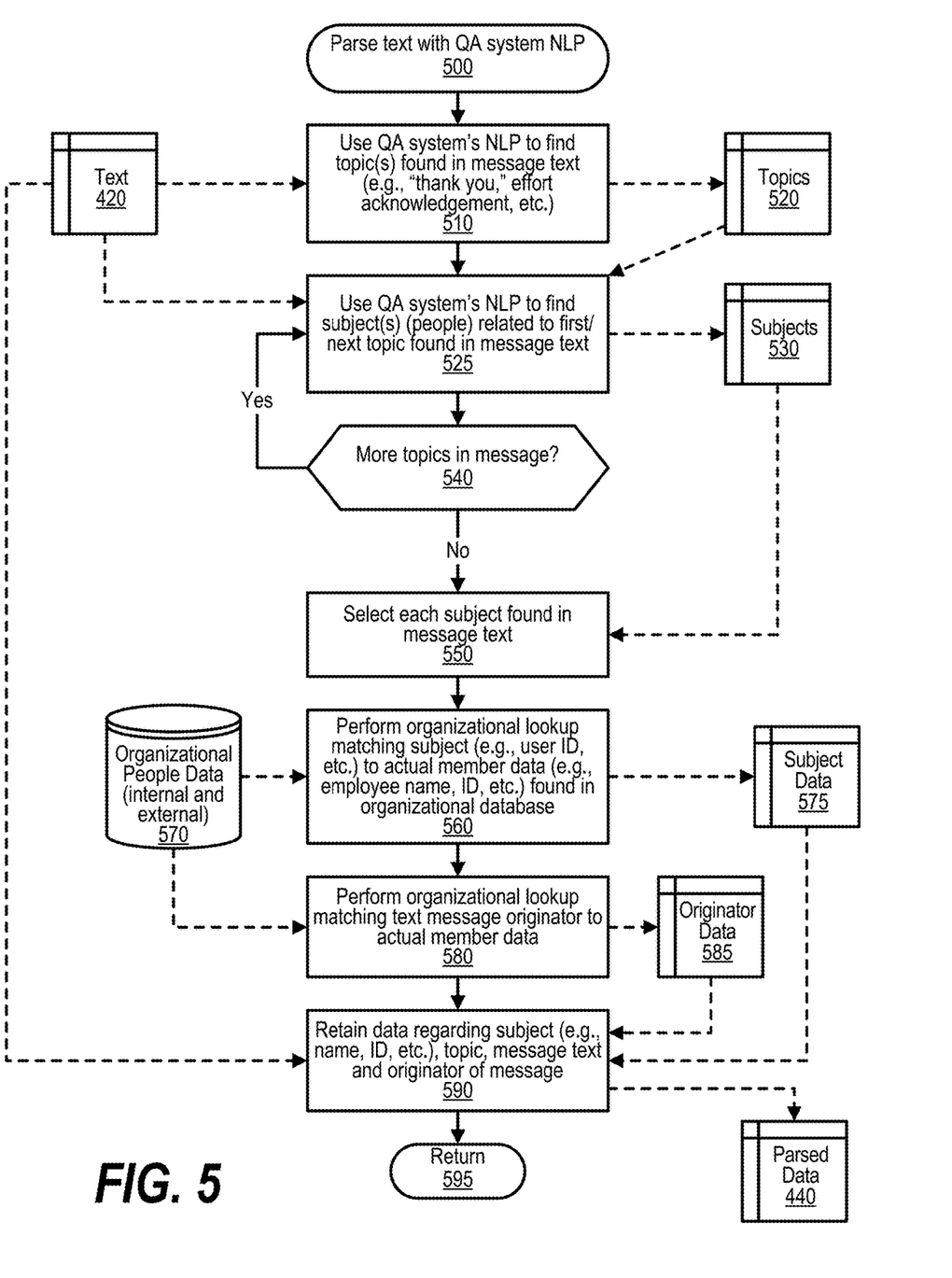
FIG. 5 is a depiction of a flowchart showing the logic used to parse textual data using a question answering (QA) system's natural language processing (NLP) capabilities.

FIG. 5 is a depiction of a flowchart showing the logic used to parse textual data using a question answering (QA) system's natural language processing (NLP) capabilities. FIG. 5 processing commences at 500 and shows the steps taken by a process that parses text using a question-answering (QA) system's natural language processing (NLP) capabilities. At step 510, the process uses the QA system's NLP to find topic(s) that are found in text 420 (e.g., "thank you," effort acknowledgement, etc.). These topics are stored in memory area 520.

At step 525, the process uses the QA system's NLP capabilities to find the subject(s) (e.g., people, etc.) that are related to the topic found in the message text. The process determines as to whether there are more topics that were found in the message text (decision 540). If there are more topics that were found in the message text, then decision 540 branches to the 'yes' branch which loops back to step 525 to find the subjects related to the next topic found in the message text. This looping continues until all of the topics found in the message text have been processed, at which point decision 540 branches to the 'no' branch exiting the loop.

At step 550, the process selects each subject (e.g., person, etc.) that was found in the message text with the selected subject being a possible contributor if a worthwhile contribution is related to the subject's work. At step 560, the process performs an organizational lookup that matches the subject (e.g., user ID, etc.) to actual member data (e.g., employee name, ID, etc.) that is found in organizational database 570. The retrieved subject-related data is stored in memory area 575. At step 580, the process performs an organizational lookup matching text message originator to actual member data. For example, the text message originator might be an employee thanking another employee for their help in solving a problem. The retrieved originator-related data is stored in memory area 585.

At step 590, the process retains the data retrieved regarding the subject (potential contributor) of the topic (potential contribution area) in memory area 440. The subject data would include the person's name, identification, etc. In addition, the related topic, message text and originator data of the message are also stored in memory area 440. The data regarding each of the subjects found in the message text is likewise stored in memory area 440. FIG. 5 processing thereafter returns to the calling routine (see FIG. 4) at 595.

FIG. 6 is a depiction of a flowchart showing the logic used to process the parsed data. FIG. 6 processing commences at 600 and shows the steps taken by a routine that processes parsed data. The process first determines whether the subject is a person, such as an employee, etc., that is evaluated by this organization's decision makers (decision 610). If the person is evaluated by this organization's decision makers, then decision 610 branches to the 'yes' branch to continue processing. On the other hand, if the person is a customer, client, etc. and is not evaluated by this organization's decision makers, then decision 610 branches to the 'no' branch and processing returns to the calling routine (see FIG. 4) at 620. If the person is evaluated by this organization's decision makers, then steps 625 through 695 are performed.

At step 625, the process uses contribution query signals to formulate one or more questions that are submitted to QA system 100 regarding whether the subject was involved in a contribution-related activity. Query signals can be modified to fine-tune contributions of interest to organization. For example, a question might be "how was the person helpful?" The contribution query signals, such as templates used to formulate questions regarding contributions for this organization, are retrieved from data store 630. The resulting natural language questions are stored in memory area 640.

At step 650, the process selects the first question for submission to the QA system. At step 660, the process submits the selected question to the QA system inquiring whether the message text includes signals of a recognizable contribution by the subject person. The question is submitted to QA system 100 and a response is received from the QA system along with a confidence level as to whether the message text indicated that the person provided a contribution.

The process determines as to whether the message text indicates a recognizable contribution by the subject person (decision 670), such as the answer to the question having a confidence level of a particular predefined threshold. If the message text indicates a recognizable contribution by the subject person, then decision 670 branches to the 'yes' branch whereupon, at step 680, the process adds the parsed data to recognition data store 460 for eventual use by one or more decision makers in the organization. On the other hand, if the message text does not indicate a recognizable contribution by the subject person, then decision 670 branches to the 'no' branch bypassing step 680.

The process determines as to whether there are more questions formulated at step 625 to be processed by the QA system (decision 690). If there are more questions to be processed by the QA system, then decision 690 branches to the 'yes' branch which loops back to step 650 to select and process the next question as described above. This looping continues until all of the questions have been processed, at which point decision 690 branches to the 'no' branch exiting the loop. FIG. 6 processing thereafter returns to the calling routine (see FIG. 4) at 695.

Figure 7:
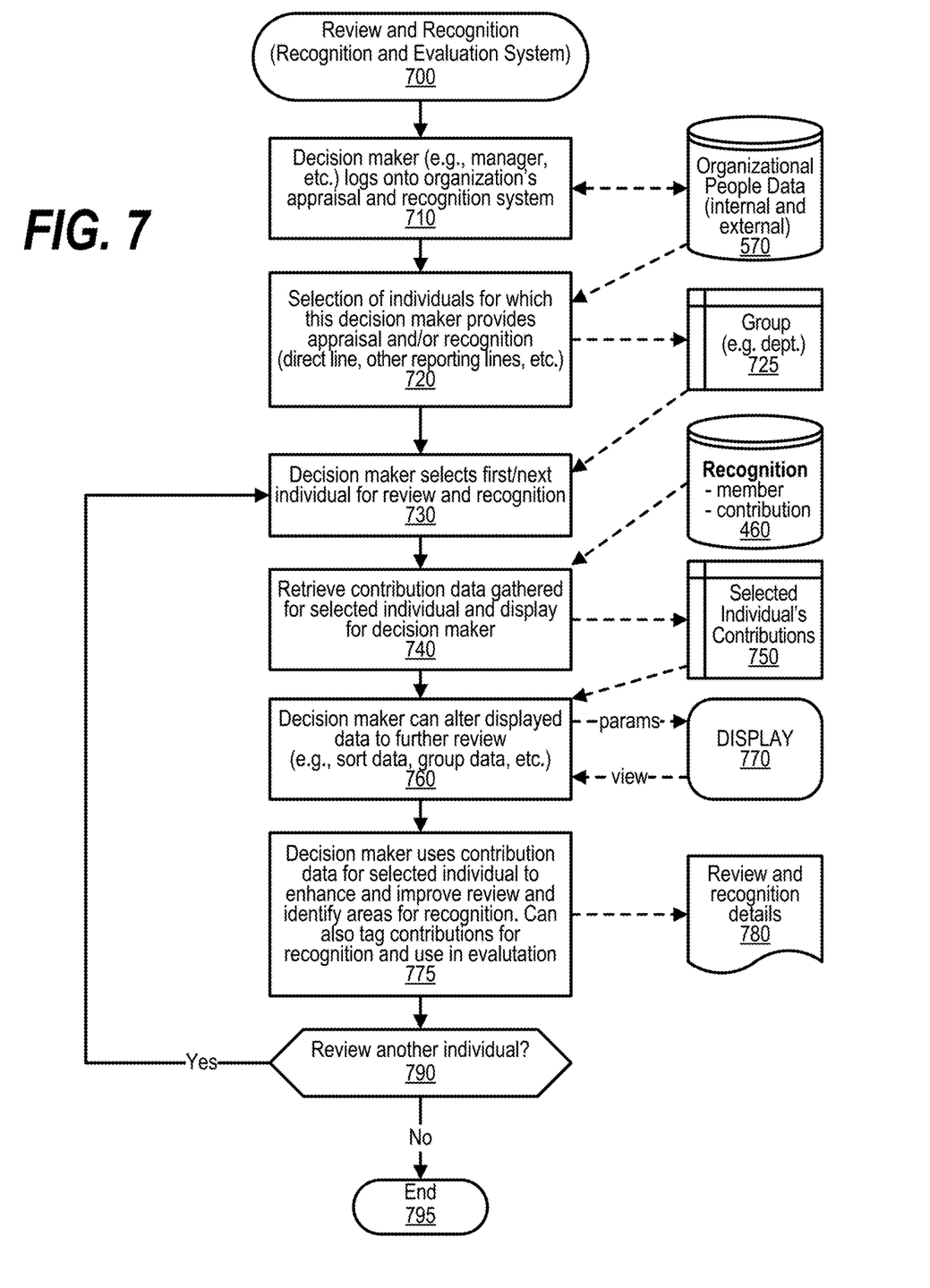
FIG. 7 is a depiction of a flowchart showing the logic used to provide individual performance reviews and contribution recognition.

FIG. 7 is a depiction of a flowchart showing the logic used to provide individual performance reviews and contribution recognition. FIG. 7 processing commences at 700 and shows the steps taken by a process that performs review and recognition functions, such as integrated in a recognition and evaluation system utilized by an organization. At step 710, a decisions maker, such as a manager, supervisor, executive, etc., logs onto organization's appraisal, recognition, and evaluation system. Data regarding the decision maker as well as the people in the decision maker's organization are retrieved from data store 570.

At step 720, the process selects individuals for which this decision maker provides appraisal and/or recognition (direct line, other reporting lines, etc.). Data regarding the individuals for which this decision maker is responsible is stored in memory area 725, such as one or more department designations, etc. At step 730, the decisions maker utilizes a user interface provided by the system to select the first individual for review and possible recognition. The individual's data is retrieved from memory area 725.

At step 740, the process retrieves the contribution data gathered for the selected individual from data store 460 and transmits the retrieved contribution data to the decision maker, such as by displaying the data in a user interface displayed on the decision maker's information handling system. The retrieved contribution data is stored in memory area 750. At step 760, the process allows the decision maker to alter the way that the data is displayed to allow for further review and analysis by the decision maker (e.g., sort data, group data, etc.). In addition, the decision maker can compare contributions made by the selected individual to other individuals in the decision maker's group, such as those contributions made by other employees at similar levels of responsibility within the organization.

At step 775, the process allows the decision maker to use the contribution data for the selected individual to enhance and improve the review of the individual as well as to identify any areas for recognition or improvement needed for the individual. In addition, the system allows the decision maker to tag contributions for recognition and use in evaluation. For example, a manager might perform a weekly check of recent contributions made by employees in the manager's department and flag those contributions that the manager wants to remember to discuss during the employee's annual performance review.

The process determines as to whether the decision maker wishes to review another individual in the organization (decision 790). If the decision maker wishes to review another individual in the organization, then decision 790 branches to the 'yes' branch which loops back to step 730 to select and display the data regarding the next selected individual as described above. This looping continues until the decision maker no longer wishes to review any other individuals, at which point decision 790 branches to the 'no' branch exiting the loop. FIG. 7 processing thereafter ends at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:

monitoring a plurality of text-based communication systems over which a plurality of textual communications are transmitted over a computer network between a plurality of users;

intercepting, by a content scraper, the plurality of textual communications as they are transmitted between the plurality of users;

ingesting the plurality of textual communications into a corpus utilized by a question answer (QA) system;

parsing, by the QA system, the plurality of textual communications using natural language processing (NLP), wherein the parsing identifies a potential contributor and a potential contribution area;

generating one or more contribution-related natural language questions, wherein at least one of the contribution-related natural language questions includes the potential contributor and the potential contribution area;

submitting the contribution-related natural language questions to the QA system;

receiving a reply to the contribution-related natural language questions from the QA system, wherein the reply indicates that the potential contributor provided a contribution, and wherein the reply includes a confidence level;

in response to the confidence level exceeding a predetermined threshold, determining that the potential contributor is a contributor who has made a recognizable contribution;

identifying at least one decision maker based on an organizational relationship between the identified decision maker and the contributor; and transmitting an identification of the contributor and the recognizable contribution to the identified decision maker.

2. The method of claim 1 further comprising:
including the identification of the contributor and the recognizable contribution in a recognition data store that is accessible by the identified decision maker.

3. The method of claim 2 further comprising:
retrieving a plurality of contributions, including the recognizable contribution, from the recognition data store, wherein each of the retrieved contributions are related to the decision maker; and
transmitting the identification of each of the contributors corresponding to each of the contributions, including the contributor corresponding to the recognizable contribution, by displaying the retrieved contributions to the decision maker.

4. The method of claim 3 wherein each of the contributors corresponding to the retrieved plurality of contributions are in a common organizational unit.

5. The method of claim 1 wherein the parsing further comprises:
identifying one or more topics in each of the textual communications; and
identifying a set of one or more of the plurality of users related to each of the textual communications, wherein one user of the set of users is the potential contributor.

6. An information handling system comprising:
one or more processors;
a memory coupled to at least one of the processors; and
a set of computer program instructions stored in the memory and executed by at least one of the processors in order to perform actions comprising:
monitoring a plurality of text-based communication systems over which a plurality of textual communications are transmitted over a computer network between a plurality of users;

intercepting, by a content scraper, the plurality of textual communications as they are transmitted between the plurality of users;

ingesting the plurality of textual communications into a corpus utilized by a question answer (QA) system;

parsing, by the QA system, the plurality of textual communications using natural language processing (NLP), wherein the parsing identifies a potential contributor and a potential contribution area;

generating one or more contribution-related natural language questions, wherein at least one of the contribution-related natural language questions includes the potential contributor and the potential contribution area;

submitting the contribution-related natural language questions to the QA system;

receiving a reply to the contribution-related natural language questions from the QA system, wherein the reply indicates that the potential contributor provided a contribution, and wherein the reply includes a confidence level;

in response to the confidence level exceeding a predetermined threshold, determining that the potential contributor is a contributor who has made is a recognizable contribution;

identifying at least one decision maker based on an organizational relationship between the identified decision maker and the contributor; and transmitting an identification of the contributor and the recognizable contribution to the identified decision maker.

7. The information handling system of claim 6 wherein the actions further comprise:

including the identification of the contributor and the recognizable contribution in a recognition data store that is accessible by the identified decision maker.

8. The information handling system of claim 7 wherein the actions further comprise:

retrieving a plurality of contributions, including the recognizable contribution, from the recognition data store, wherein each of the retrieved contributions are related to the decision maker; and transmitting the identification of each of the contributors corresponding to each of the contributions, including the contributor corresponding to the recognizable contribution, by displaying the retrieved contributions to the decision maker.

9. The information handling system of claim 8 wherein each of the contributors corresponding to the retrieved plurality of contributions are in a common organizational unit.

10. The information handling system of claim 6 wherein the parsing further comprises:

identifying one or more topics in each of the textual communications; and identifying a set of one or more of the plurality of users related to each of the textual communications, wherein one user of the set of users is the potential contributor.

11. A computer program product stored in a computer readable storage medium, comprising computer program code that, when executed by an information handling system, performs actions comprising:

monitoring a plurality of text-based communication systems over which a plurality of textual communications are transmitted over a computer network between a plurality of users;

intercepting, by a content scraper, the plurality of textual communications as they are transmitted between the plurality of users;

ingesting the plurality of textual communications into a corpus utilized by a question answer (QA) system;

parsing, by the QA system, the plurality of textual communications using natural language processing (NLP), wherein the parsing identifies a potential contributor and a potential contribution area;

generating one or more contribution-related natural language questions, wherein at least one of the contribution-related natural language questions includes the potential contributor and the potential contribution area;

submitting the contribution-related natural language questions to the QA system;

receiving a reply to the contribution-related natural language questions from the QA system, wherein the reply indicates that the potential contributor provided a contribution, and wherein the reply includes a confidence level;

in response to the confidence level exceeding a predetermined threshold, determining that the potential contributor is a contributor who has made a recognizable contribution;

identifying at least one decision maker based on an organizational relationship between the identified decision maker and the contributor; and transmitting an identification of the contributor and the recognizable contribution to the identified decision maker.

12. The computer program product of claim 11 wherein the actions further comprise:

including the identification of the contributor and the recognizable contribution in a recognition data store that is accessible by the identified decision maker.

13. The computer program product of claim 12 wherein the actions further comprise:

retrieving a plurality of contributions, including the recognizable contribution, from the recognition data store, wherein each of the retrieved contributions are related to the decision maker; and transmitting the identification of each of the contributors corresponding to each of the contributions, including the contributor corresponding to the recognizable contribution, by displaying the retrieved contributions to the decision maker.

14. The computer program product of claim 13 wherein each of the contributors corresponding to the retrieved plurality of contributions are in a common organizational unit.

15. The computer program product of claim 11 wherein the parsing further comprises:

identifying one or more topics in each of the textual communications; and identifying a set of one or more of the plurality of users related to each of the textual communications, wherein one user of the set of users is the potential contributor.

* * * * *